United States Patent
Holt et al.

(10) Patent No.: US 11,379,888 B2
(45) Date of Patent: Jul. 5, 2022

(54) SYSTEMS, METHODS AND DEVICES FOR GAMIFICATION OF WATER CONSERVATION

(71) Applicants: Kassandra Holt, Salt Lake City, UT (US); Timothy Holt, Salt Lake City, UT (US); Allison Drennan, Salt Lake City, UT (US); Katelin Drennan, Salt Lake City, UT (US); Eric Snaufer, SaSalt Lake City, UT (US); Carter Lechtenberg, Salt Lake City, UT (US)

(72) Inventors: Kassandra Holt, Salt Lake City, UT (US); Timothy Holt, Salt Lake City, UT (US); Allison Drennan, Salt Lake City, UT (US); Katelin Drennan, Salt Lake City, UT (US); Eric Snaufer, SaSalt Lake City, UT (US); Carter Lechtenberg, Salt Lake City, UT (US)

( * ) Notice: Subject to any disclaimer, the term of this patent is extended or adjusted under 35 U.S.C. 154(b) by 704 days.

(21) Appl. No.: 16/249,410

(22) Filed: Jan. 16, 2019

(65) Prior Publication Data
US 2019/0220907 A1    Jul. 18, 2019

Related U.S. Application Data

(60) Provisional application No. 62/617,927, filed on Jan. 16, 2018.

(51) Int. Cl.
G06Q 30/02 (2012.01)
G06Q 20/08 (2012.01)
G09B 7/06 (2006.01)
G06F 3/0482 (2013.01)
G09B 19/00 (2006.01)

(52) U.S. Cl.
CPC ....... *G06Q 30/0279* (2013.01); *G06Q 20/085* (2013.01); *G09B 7/06* (2013.01); *G09B 19/00* (2013.01); *G06F 3/0482* (2013.01)

(58) Field of Classification Search
None
See application file for complete search history.

(56) References Cited

U.S. PATENT DOCUMENTS

| | | | | |
|---|---|---|---|---|
| 2010/0121700 A1* | 5/2010 | Wigder | ................... | G06Q 20/26 705/14.25 |
| 2010/0289652 A1* | 11/2010 | Javey | .................... | G06F 3/0484 340/605 |
| 2012/0054125 A1* | 3/2012 | Clifton | ................... | G06Q 50/06 705/412 |
| 2018/0008905 A1* | 1/2018 | Dorfman | ............... | B01D 5/0003 |
| 2019/0050950 A1* | 2/2019 | Flanzer | ................... | G06Q 50/06 |

* cited by examiner

Primary Examiner — Nathan Hillery
(74) Attorney, Agent, or Firm — K2T3 PLLC

(57) ABSTRACT

Water conservation through behavior modification is achieved by guiding a user of an App through a quiz interface illustrating facts about water usage, a simulation providing a simulated water conservation experience, a commitment interface inviting the user to save water, a social good interface to provide the user a good feeling about saving water and a personal water usage tracking system to help the user understand their progress toward water conservation.

2 Claims, 3 Drawing Sheets

SYSTEMS, METHODS AND DEVICES FOR GAMIFICATION OF WATER CONSERVATION

CROSS-REFERENCE TO RELATED APPLICATIONS

This application claims the benefit under 35 U.S.C. § 119(e) of U.S. Provisional Application No. 62/617,927 filed Jan. 16, 2018, which is hereby incorporated by reference herein in its entirety.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Techniques, apparatus and methods are disclosed that enable water conservation through behavior modification by guiding a user of an App through a quiz interface illustrating facts about water usage, a simulation providing a simulated water conservation experience, a commitment interface inviting the user to save water, a social good interface to provide the user a good feeling about saving water and a personal water usage tracking system to help the user understand their progress.

Due to pollution growth, Utah cannot meet water demand in 2025 without conservation according to the Utah Department of Natural Resources 2014 Water Report. People want to conserve water but water conservation education alone will not solve this.

A water conserving iPhone App can use the gamification process to help users change their behavior. The gamification principles are: a belief in the problem, education, simulation, commitment, social good and tracking of the commitment. Embodiments disclosed within implement the principles and apply the principles to water conservation with specific screens and implementations. For example, an embodiment of an App executing on a mobile device has screens for educational trivia, water conservation simulation, water conservation commitment goals, contributing to a social good of water conservation, and tracks personal water usage data against the commitment.

Figure 1:
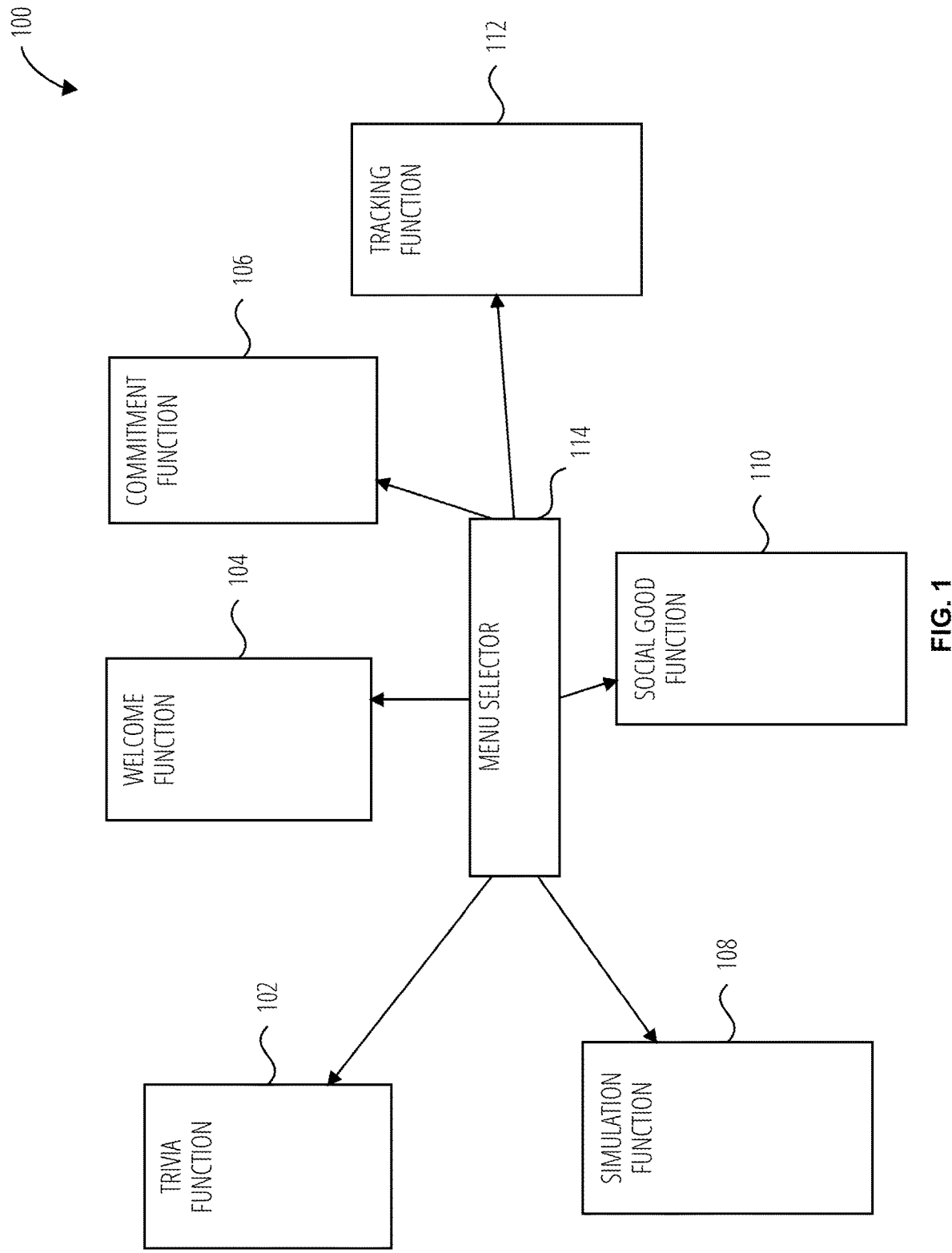
FIG. 1 illustrates a schematic diagram 100 illustrating a system for gamification of water conservation consistent with embodiments disclosed herein.

In FIG. 1, the schematic diagram 100 of the mobile application comprises a trivia function 102, a welcome function 104, a simulation function 108, a social good function 110, a tracking function 112, and a Menu Selector 114. The Menu Selector 114 includes buttons or other selection items that allows a user to select to enter a function of the application. The trivia function 102 provides questions to a user in the form of a game. This allows the user to learn facts about water conservation. Once the user is comfortable with facts, the user can use the gained knowledge from the trivia function 102 and apply the knowledge in the simulation function 108. The simulation function 108 allows a user to experiment with their knowledge in a simulated environment and discover how water conservation works. When comfortable with their experience, the user can choose to commit to water conservation in the commitment function 106. The commitment function 106 provides information about various levels of commitment and the water conservation a user could expect from a commitment, such as installing shower heads (a small effect on conservation) or purchasing a smart sprinkler controller (a large effect on conservation). Once committed, the user can then track their progress with the tracking function 112. The tracking function can connect to a utility to retrieve personal water usage and display the actual usage to the user, including comparisons with the neighborhood and Utah as a whole. As the user can be conserving water and potentially saving money, the user can be invited to contribute savings to a social good, such as a charity. In some cases, the utilities can offer incentives to water savers—such as a donation on their behalf. This social good completes the loop on behavior modification and encourages the user to keep the commitment because it benefits others.

Figure 2:
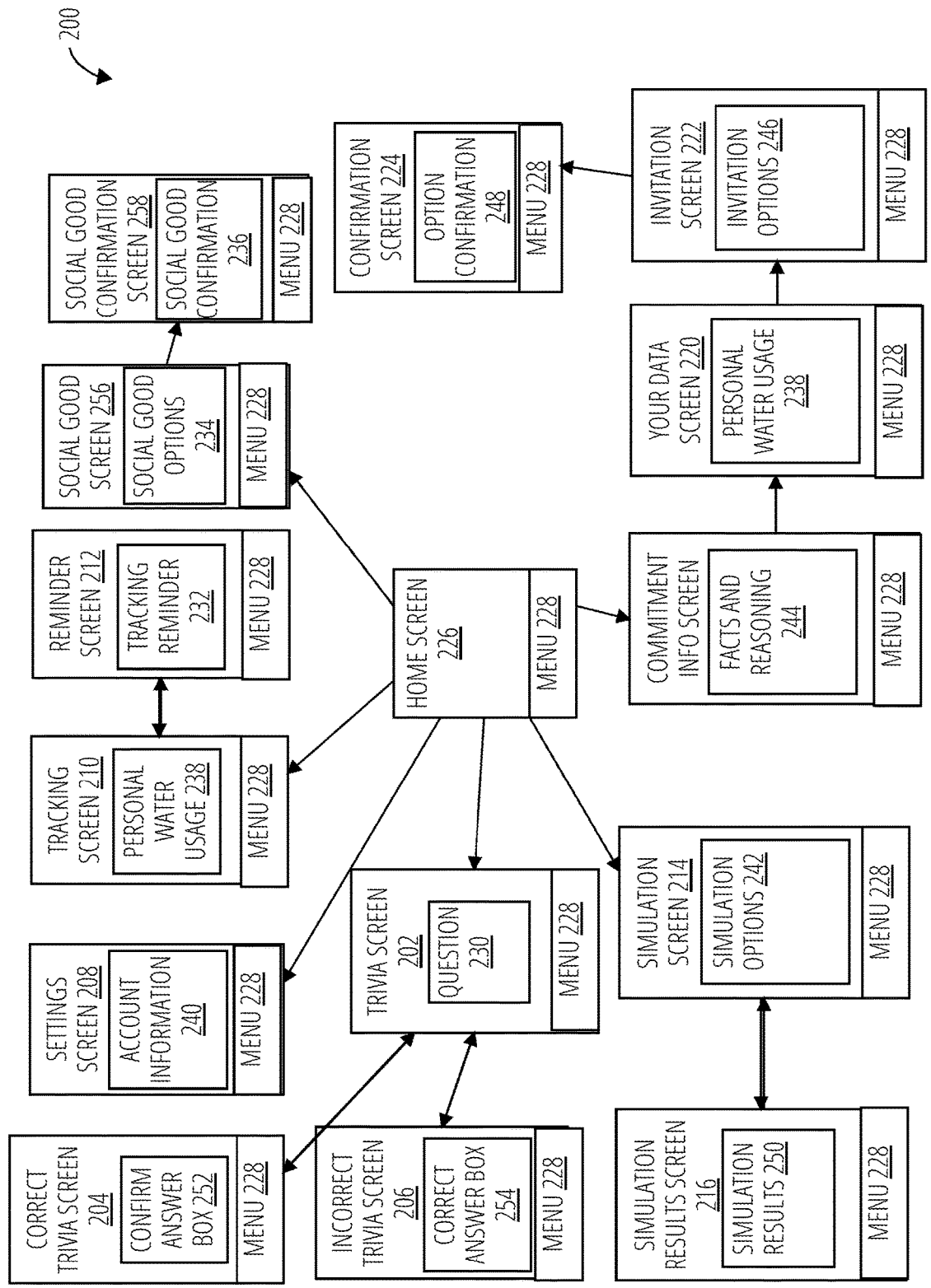
FIG. 2 illustrates a flowchart 200 illustrating a method for gamification of water conservation consistent with embodiments disclosed herein.

In FIG. 2, an embodiment of a water conservation mobile app executing on a mobile device is shown. The flowchart 200 comprises a Trivia Screen 202, a Correct Trivia Screen 204, an Incorrect Trivia Screen 206, a Settings Screen 208, a Tracking Screen 210, a Reminder Screen 212, a Simulation Screen 214, a Simulation Results Screen 216, a Commitment Info Screen 218, a Your Data Screen 220, an Invitation Screen 222, a Confirmation Screen 224, a Home Screen 226, a Menu 228, a Question 230, a Tracking Reminder 232, a Social Good Options 234, a Social Good Confirmation 236, a Personal Water Usage 238, an Account Information 240, a Simulation Options 242, a Facts and Reasoning 244, a Personal Water Usage 238, an Invitation Options 246, an Option Confirmation 248, a Simulation Results 250, a Confirm Answer Box 252, a Correct Answer Box 254, a Social Good Screen 256, and a Social Good Confirmation Screen 258. These screens implement behavior modification through gamification for water conservation. The principles of gamification are: a belief in the problem, education, simulation, commitment, social good and tracking of the commitment. By downloading the App, the users have already shown a belief in the problem. The App then implements the other principles and applies systems to achieve personal water conservation.

In the embodiment, the user starts at a Home Screen 226 and uses a Menu 228 to select which portion of the App to engage. The user can select to go to a Trivia Screen 202, which allows the user to learn facts about water conservation. The Trivia Screen 202 can render a Question 230 that includes both a prompt and potential answers. In response to correct input, the Correct Trivia Screen 204 can be shown which confirms the selected answer in a Confirm Answer Box 252. In response to incorrect input, the Incorrect Trivia Screen 206 can render the correct answer in a Correct Answer Box 254.

The user can apply knowledge gained through the Trivia Screen 202, by selecting the Simulation Screen 214 from the Menu 228 on the Home Screen 226. The simulation screen can provide water conservation options as Simulation Options 242 on the Simulation Screen 214. After selection, the Simulation Results Screen 216 can be shown that includes Simulation Results 250. The Simulation Results 250 can describe consequences of the selection of the Simulation Options 242. This allows the user to see how different water conservation implementations work, and gain experience and confidence in water conservation efforts.

With an understanding of the facts and experience in simulated water conservation, the user can select the Commitment Info Screen 218 from Menu 228. This screen provides Facts and Reasoning 244 in encouraging the user to commit to water conservation. The user can access the Your Data Screen 220 which includes Personal Water Usage 238 that is retrieved from a utility service provider, such as AquaHawk. Using this information, the system can render an Invitation Screen 222 for the user that includes Invitation Options 246 for different commitments to water conservation, such as adding low-flow showerheads or a smart irrigation controller. After selection, a Confirmation Screen 224 can be shown with the Option Confirmation 248 providing more information about their commitment.

The user can then select a Tracking Screen 210 which shows their Personal Water Usage 238. The Tracking Screen 210 can also link to a Reminder Screen 212 that provides information including a Tracking Reminder 232 that can include information about the commitment to water conservation.

The system can render a Social Good Screen 256 when selected from Menu 228. The Social Good Screen 256 can include Social Good Options 234 that invites a user to contribute savings or apply incentive credits, such as from a utility, to a social good, such as to people struggling to pay bills. The user then selects the option and a Social Good Confirmation Screen 258 is shown. The Social Good Confirmation Screen 258 can include a Social Good Confirmation 236 that confirms the social good performed by the user. This social good screen allows the user to become motivated to continue water conservation because the conservation helps the environment and helps others—providing a positive feedback to the user.

A Settings Screen 208 can receive Account Information 240 from a user that allows the system to request Personal Water Usage 238 from a utility service provider. In addition, profile information can be received that allows the user to receive incentives from the utility or others interested in water conservation.

Figure 3:
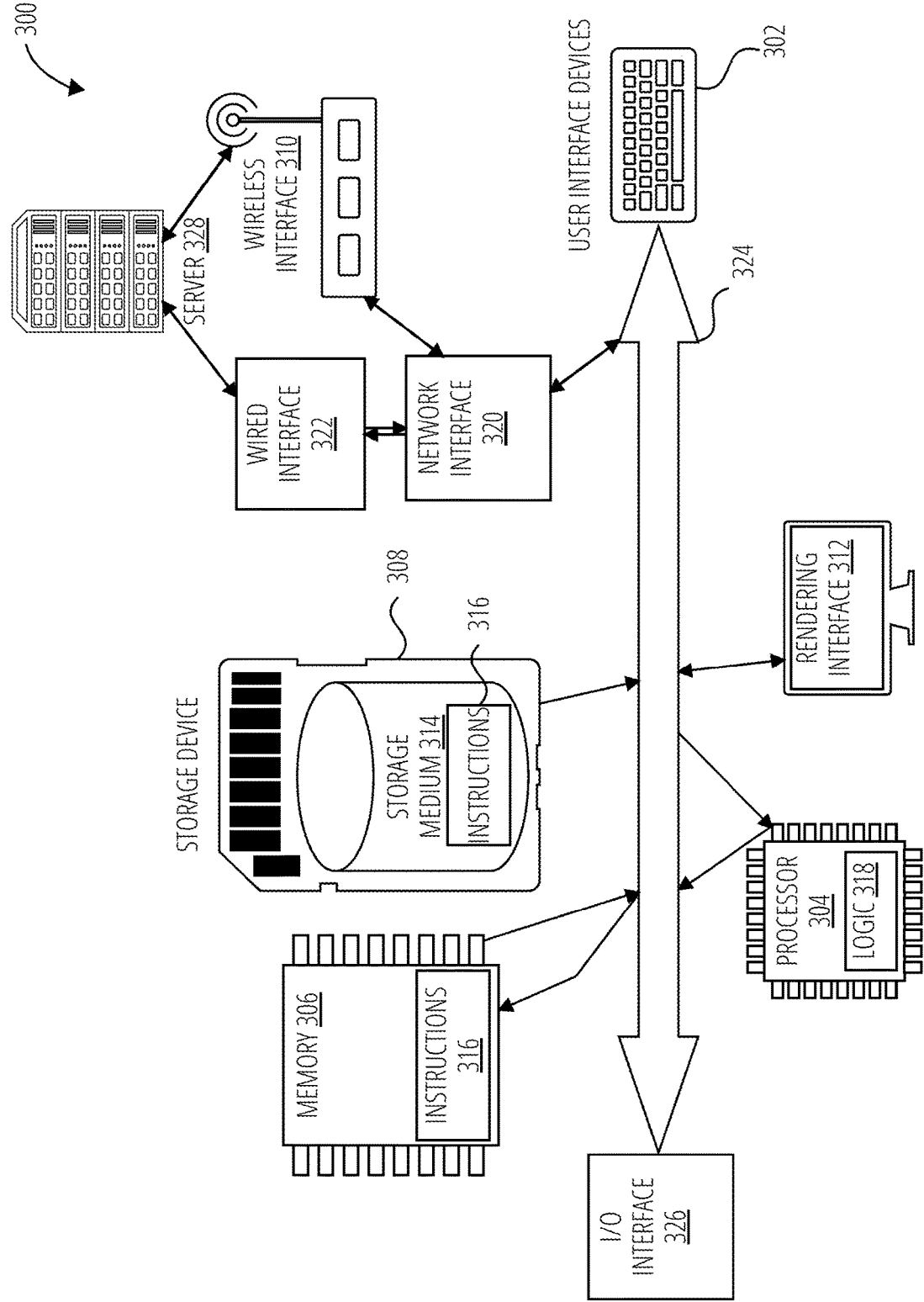
FIG. 3 illustrates a computing system 300 in accordance with one embodiment.

FIG. 3 is a schematic diagram of a computing system 300 consistent with embodiments disclosed herein. The computing system 300 can be viewed as an information passing bus that connects various components. In the embodiment shown, the computing system 300 includes a processor 304 having logic 318 for processing instructions. Instructions can be stored in and/or retrieved from memory 306 and a storage device 308 that includes a computer-readable storage medium 314. Instructions and/or data can arrive from a server 328 through a network interface 320 that can include wired interface 322 or wireless interface 310 capabilities. Instructions and/or data can also come from an I/O interface 326 that can include such things as expansion cards, secondary buses (e.g., USB, etc.), devices, etc. A user can interact with a computing system 300 though user interface devices 302 and a rendering interface 312 that allows the computer to receive and provide feedback to the user.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of the embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring aspects of embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

Those having skill in the art will appreciate that many changes may be made to the details of the above-described embodiments without departing from the underlying principles. The scope of the present embodiments should, therefore, be determined only by the following claims.

What is claimed is:

1. A computer program product comprising a non-transitory computer-readable storage medium that stores instructions for execution by a processor to perform operations of a water conservation mobile application executing on a mobile device, the operations, when executed by the processor, to perform a method, the method comprising:
    rendering a set of trivia screens providing water conservation facts, comprising:
        rendering a water conservation question;
        processing a water conservation answer selection indicated by a user; and
        rendering a confirmation of a water conservation answer when the water conservation answer selection is correct;
    rendering a set of water conservation simulation screens providing water conservation simulation, comprising:
        rendering a water conservation simulation screen with water conservation simulation options;
        processing, in a simulated environment, a set of water conservation simulation options indicated by the user; and
        rendering, based on the simulation options indicated by the user, a water conservation results screen that includes water conservation results of the simulated environment;
    rendering a set of commitment screens enabling a commitment to water conservation from the user, comprising:
        rendering a commitment information screen comprising water conservation information;
        retrieving personal water usage data for the user from a utility service provider;
        rendering a personal data screen that displays personal water usage data of the user;
        rendering an invitation to select from a set of water conservation options;
        process a water conservation option indicated by the user;
        indicate, based on the personal water usage data and the water conservation option, a projected water conservation; and
        render a confirmation screen that indicates the water conservation option indicated by the user;
    rendering a set of water conservation tracking screens, comprising:
        rendering a personal water usage tracking screen that displays a graph of personal water usage over time, an average of neighborhood water usage, and the water conservation expected from the water conservation option;
        rendering a reminder of the water conservation option when the water conservation option has been indicated by the user; and
    rendering a set of social good screens, comprising:
        rendering a social good screen comprising a donation invitation to pay a donation based on water usage conservation;
        processing a payment from the user based on the water usage conservation; and
        rendering a donation confirmation screen of a successful donation;
    rendering a set of settings screens, comprising:
        rendering account information for a utility service provider; and
        processing, based on user input, changes to the account information.

2. The computer program product of claim 1, wherein the rendering the personal water usage tracking screen further comprises rendering an additional graph of personal water usage over time with a comparison of an average of neighborhood water usage.

* * * * *